United States Patent [19]

Kan et al.

[11] Patent Number: 5,973,077
[45] Date of Patent: Oct. 26, 1999

[54] 4-METHYL-1-PENTENE RESIN COMPOSITION AND A LAMINATED BODY USING THE RESIN COMPOSITION

[75] Inventors: Kojiro Kan; Shinichi Imuta, both of Waki-cho, Japan

[73] Assignee: Mitsui Chemicals, Inc., Tokyo, Japan

[21] Appl. No.: 08/791,407

[22] Filed: Jan. 30, 1997

[30] Foreign Application Priority Data

Feb. 1, 1996 [JP] Japan .................................. 8-016655

[51] Int. Cl.$^6$ ........................................................ C08L 23/18
[52] U.S. Cl. ................................................................ 525/240
[58] Field of Search ............................................. 525/240

[56] References Cited

U.S. PATENT DOCUMENTS

| | | | |
|---|---|---|---|
| 4,546,150 | 10/1985 | Shigemoto | 525/240 |
| 4,988,558 | 1/1991 | Shigemoto | 525/240 |
| 5,025,057 | 6/1991 | Shigemoto | 525/240 |
| 5,382,620 | 1/1995 | Nagase et al. | 525/240 |

FOREIGN PATENT DOCUMENTS

| | | |
|---|---|---|
| 0322216 | 6/1989 | European Pat. Off. . |
| 0573173 | 12/1993 | European Pat. Off. . |
| 9117211 | 11/1991 | WIPO . |

*Primary Examiner*—Donald R. Wilson
*Attorney, Agent, or Firm*—Sherman and Shalloway

[57] ABSTRACT

A 4-methyl-1-pentene resin composition comprising (A) 20 to 60 parts by weight of poly-4-methyl-1-pentene or a copolymer chiefly composed of 4-methyl-1-pentene, (B) 30 to 60 parts by weight of an ethylene/butene copolymer, (C) 5 to 40 parts by weight of poly-1-butene or a copolymer chiefly composed of 1-butene and another α-olefin, and (D) 0 to 30 parts by weight of a propylene/butene copolymer is provided. The composition of the present invention has excellent heat resistance, transparency, gas permeability, mold releasability, liquid drainability, heat seal strength, and impact resistance. Especially, it has excellent adhesive properties to 4-methyl-1-pentene resin and other resins and is preferably used for the production of laminated products.

11 Claims, No Drawings

4-METHYL-1-PENTENE RESIN COMPOSITION AND A LAMINATED BODY USING THE RESIN COMPOSITION

BACKGROUND OF THE INVENTION

1. Field of the Invention

This invention relates to an industrially useful resin composition, especially an adhesive resin composition for the production of a laminated body, and to a laminated body using the resin composition.

More specifically, the invention relates to a 4-methyl-1-pentene resin composition preferably used for the production of a laminated body having excellent heat resistance, transparency, gas permeability, mold releasability and liguid drainability as attributes of 4-methyl-1-pentene polymer, and having excellent heat sealing strength, excellent mechanical properties such as impact resistance and particulary, excellent in adhesiveness not only to 4-methyl-1-pentene resin but also to other type of resins, and also relates to a laminate body such as bottles, containers, films and sheets using the resin composition.

2. Prior Art

4-Methyl-1-pentene polymers by utillizing its good properties such as heat resistance, transparency, gas permeability and releasability plan to extend uses to various usages such as tableware for electronic cooking ovens, releasable films for FPC, paper or baking cartons for the step of making artificial leather, medical treatment syringes or containers for preserving medicines, agricultural chemicals, cosmetics or blood or measuring instruments therefor and preservation containers for vegetables and fruits. However, there are problems in that their heat sealing strength and impact resistance are inferior, and their practical properties are desired to be increased further. In the case of forming containers, it was desired to improve their rigidity, especially their properties such as their rigidity at high temperatures. Thus, the 4-methyl-1-pentene type resin and another thermoplastic resin such as a polyolefin, polyesters or polyamides were investigated to form multilayered structures. For example, it is investigated that 4-methyl-1-pentene type resin and another polyolefin resin having excellent heat sealability and impact strength, especially an ethylene type polymer, are multilayered to supplement each other.

However, 4-methyl-1-pentene polymer has poor adhesiveness to another resin such as an ethylene type polymer, even when both belong to the same category of olefin polymer, owing to its low surface tension. Accordingly, it was difficult to directly adhere the above resin and to prepare multilayer laminate.

For this reason, adhesive resins to be used as an adhesive layer to be an intermediate medium have been variously investigated (Japanese Patent Publication No. 59768/1992, Japanese Laid-Open Patent Publication No.145844/1985). There are uses in which a certain result has been obtained by these techniques, but there are new uses in which a further improvement in performance is required for further improvement. 4-Methyl-1-pentene resin composition in which a balance in properties is good, a laminated body using a 4-methyl-1-pentene composition and a 4-methyl-1-pentene resin composition for adhering for the preparation of a laminated body are desired in the above new uses. Furthermore, a thermoplastic resin other than the polyolefins was also investigated to form multilayer laminate with the 4-methyl-1-pentene resin (Japanese Laid-Open Patent Publication No. 107438/1992). But according to this technique, interlayer adhesiveness was not enough, and a further improvement was desired.

SUMMARY OF THE INVENTION

Accordingly, it is an object of this invention to provide an adhesive resin composition for formation of a multilayer, namely an adhesive resin composition having excellent adhesion strength to another resin layer.

More specifically, it is still another object of this invention to provide an adhesive composition having excellent adhesion strength to not only a 4-methyl-1-pentene resin but also to a resin having excellent heat sealability and impact resistance (such as a polyolefin, especially a polyethylene polymer or its composition).

A further object of the invention is to provide an adhesive composition having high strong adhesion strength to a 4-methyl-1-pentene resin and a resin having excellent heat resistance, gas barrier property and transparency (for example, nylons or polyesters).

A further object of the invention is to provide a laminated body using the adhesive resin composition as an adhesive layer, and a molded product produced from the laminated body.

According to this invention, there is provided a 4-methyl-1-pentene resin composition comprising:

(A) 20 to 60 parts by weight of poly(4-methyl-1-pentene) or a copolymer chiefly composed of 4-methyl-1-pentene, (B) 30 to 60 parts by weight of an ethyelene/butene copolymer, (C) 5 to 40 parts by weight of poly-1-butene or a copolymer chiefly composed of 1-butene and another $\alpha$-olefin, and (D) 0 to 30 parts by weight of a propylene/butene copolymer, with the proviso that the total amount of (A), (B), (C) and (D) is 100 parts by weight.

Furthermore, the present invention also provides a laminated body composed of the resin composition as an adhesive layer, and a molded product prepared from the laminated body.

DETAILED DESCRIPTION OF PREFERRED EMBODIMENTS

The 4-methyl-1-pentene polymer composition of the present invention and a molded product prepared by using the above composition, especially a laminated body will be described in detail.

The 4-methyl-1-pentene polymer (A) used in this invention is a homopolymer of 4-methyl-1-pentene, or a copolymer of 4-methyl-1-pentene and another $\alpha$-olefin. It is a polymer composed chiefly of 4-methyl-1-pentene which contains at least 80% by weight of 4-methyl-1-pentene. Especially from the viewpoint of an increase of its adhesiveness, copolymers are preferred, and it is especially preferred that a content of 4-methyl-1-pentene should be not larger than 99.9% by weight.

Other $\alpha$-olefins used to prepare the copolymers include ethylene and $\alpha$-olefins having 3 to 20 carbon atoms such as propylene, 1-butene, 1-hexene, 1-octene, 1-decene, 1-tetradecene, 1-octadecene and 1-eicosene. When other $\alpha$-olefins are contained, these $\alpha$-olefins may be used singly, or in a combination of at least two monomers. Preferred $\alpha$-olefins as comonomers include 1-decene, 1-dodecene, 1-tetradecene, 1-hexadecene, 1-octadecene and 1-eicosene.

Such a 4-methyl-1-pentene type polymer (A) preferably has a melt flow rate (MFR) of generally 0.1 to 200 g/10 minutes, especially preferably 1.0 to 150 g/10 minutes, as measured in accordance with ASTM D1238 at a load of 5.0 Kg and a temperature of 260° C.

By selecting such a melt flow rate, mixability of (A) with components (B), (C) and (D) increases and a high adhesion property can be obtained.

The ethylene/butene copolymer (B) used in this invention is an ethylene/butene random copolymer composed of, as a main component, at least 50% by weight to not larger than 90% by weight of ethylene. Especially when ethylene in an amount of 55% by weight to 85% by weight is selected, the pliability of the adhesion layer increases. Furthermore, since the dispersion of the ethylene/butene copolymer in the composition becomes high, the adhesion property of the composition increases.

Examples of butene to be used for copolymerization include butene-1, isobutene and butene-2. They may be included singly or in a combination of at least two monomers. Furthermore, they may contain other α-olefins such as α-olefins having 3 to 20 carbon atoms. Preferred olefins for copolymerization are butene-1 and isobutene.

Such an ethylene/butene copolymer (B) preferably has a melt flow rate (MFR), measured in accordance with ASTM D1238 at a load of 2.16 Kg and a temperature of 190° C., of generally 0.1 to 50 g/10 minutes, especially preferably 1.0 to 30 g/10 minutes.

By selecting such a component (B), the mixability of (B) with other components (A), (C) and (D) becomes high, and a high adhesion property can be obtained.

The 1-butene polymer (C) used in this invention is a homopolymer of 1-butene, or a copolymer of 1-butene with another α-olefin, especially a polymer composed chiefly of butene-1 in an amount of at least 60% by weight. Especially when the compability with the 4-methyl-1-pentene polymer is good, the content of butene-1 is preferably at least 80% by weight.

Other olefins to be used in copolymerization may be ethylene and α-olefins having 3 to 20 carbon atoms such as propylene, 1-hexene, 1-octene, 1-decene, 1-tetradecene and 1-octadecene. When such α-olefins are contained, the α-olefins may be used singly or in a combination of at least two monomers. Preferred olefins as copolymer components include ethylene and propylene.

Such a butene-1 type polymer (C) preferably has a melt flow rate (MFR), as measured in accordance with ASTM D1238 at a load of 2.16 Kg at a temperature of 190° C., of generally 0.1 to 100 g/10 minutes, more preferably 0.1 to 50 g/10 minutes.

By selecting such a melt flow rate, the mixability of (C) with other components (A), (B) and (D) becomes high, and a high adhesion property can be obtained.

The propylene/butene copolymer (D) used in this invention is a propylene/butene random copolymer, a polymer composed mainly of 50 to 90% by weight of propylene. From the viewpoint of the fact that the mechanical strength of the adhesive composition increases and the adhesive composition can develop high adhesive properties both to the 4-methyl-1-pentene polymer and to the ethylene polymer, propylene should preferably have a content of 60 to 85% by weight.

Examples of butene used for copolymerization are butene-1, isobutene and butene-2. They may be used singly or in a combination of at least two monomers. Furthermore, ethylene and α-olefins such as α-olefins having 3 to 20 carbon atoms may be contained. Olefins preferably used for copolymerization include butene-1 and isobutene.

Such a propylene/butene copolymer (D) should preferably have a melt flow rate (MFR), as measured in accordance with ASMD D1238 at a load of 5 Kg at a temperature of 260° C., of generally 0.1 to 200 g/10 minutes, more preferably 1.0 to 100 g/10 minutes. By selecting such a melt flow rate, the mixability of (D) with other components (A), (B) and (C) increases, and a high adhesive property can be obtained.

The compounding proportions of the 4-methyl-1-pentene polymer (A), the ethylene/butene polymer (B), the 1-butene polymer (C) and the propylene/butene polymer (D) in the composition of the present application should be such that with respect to 20 to 60 parts by weight of (A), the amount of component (B) is 30 to 60 parts by weight, the amount of component (C) is 5 to 40 parts by weight, and the amount of component (D) is 0 to 30 parts by weight and the total amount of (A)+(B)+(C)+(D)=100 parts by weight because high adhesive properties are developed to both of the 4-methyl-1-pentene polymer and an olefin-type polymer, especially an ethylene-type polymer and the two layers can be firmly adhered. To further increase the adhesion strength, with respect to 30 to 50 parts by weight of (A), the amount of (B) should be 35 to 50 parts by weight, the amount of (C) should be 10 to 30 parts by weight, and the amount of (D) should be 5 to 20 parts by weight, and the total amount of (A)+(B)+(C) and (D)=100 parts by weight.

Since the composition obtained by this invention can give high adhesive properties to the 4-methyl-1-pentene-type polymer and the ethylene-type polymer, the above adhesive composition should have a melt flow rate (MFR), as measured in accordance with ASTM D1238 at a load of 5.0 Kg at a temperature of 260° C., of preferably 0.1 to 200 g/10 minutes, more preferably 1.0 to 100 g/10 minutes.

The 4-methyl-1-pentene-type polymer composition is obtained by mixing (A) a 4-methyl-1-pentene type polymer, (B) an ethylene/butene copolymer, (C) a 1-butene-type polymer and (D) a propylene/butene copolymer of predetermined amounts by various known methods using a V-blender, a ribbon blender, a Henschel mixer or a tumbler blender, melt kneading the mixture with a single screw extruder, a multi-screw extruder, a kneader, a Bumbury mixer or a biaxial extruder, and thereafter, granulating or pulverizing the melt-kneaded mixture.

Various compounding agents may be added to an ordinary polyolefin such as a silane coupling agent, a weatherability stabilizer, a heat stabilizer, a slip agent, a nucleus agent, a pigment or a dye may be added to the 4-methyl-1-pentene-type polymer composition of the present invention within the range which does not impair the objects of the present invention.

A laminated body of the adhesive composition obtained in the invention can be prepared from (E) a sheet composed of a 4-methyl-1-pentene-type polymer having at least 80% by weight of 4-methyl-1-pentene and (F) a sheet composed of a thermoplastic resin other than the (E) layer. The adhesion strength between layers of the laminated body depends upon the individual layers. When it is prepared by laminating the 4-methyl-1-pentene-type polymer/adhesive layer (composition)/ethylene-type layer having a film thickness of 20/10/20 μm, the adhesive strength may be adjusted to at least 0.15 Kgf/15 mm.

The present invention can provide a laminated body or a laminated molded body prepared from at least three layers comprising (E) a layer of poly(4-methyl-1-pentene) or a layer of a copolymer composed chiefly of at least 80% by weight of 4-methyl-1-pentene, (F) a layer of a thermoplastic resin other than the layer (E), and a layer of the adhesive resin composition (adhesive layer) interposed between layers (E) and (F).

This laminated body is a laminated body comprising a poly(4-methyl-1-pentene) resin layer and a thermoplastic resin layer and therebetween an adhesive resin composition layer and has excellent interlayer adhesive strength and forms a firm laminated structure having excellent mechanical strength and also shows excellent heat resistance and transparency. When it is formed as a molded product, the product has excellent impact strength and shatter strength.

Furthermore, for example, the laminated body of a 4-methyl-1-pentene type resin/polyolefin resin has excellent gas permeability, and when the polyolefin resin layers of the laminated body, such as ethylene resin layers (F), are heat-sealed, it is possible to prepare a tough bag having excellent gas permeability.

As a result, the product can be used anew in using for packaging to maintain freshness.

The oxygen permeability of the laminated body depends upon the thickness of the individual layers. For example, a three-layer film composed of a 4-methyl-1-pentene polymer, adhesive layer and the ethylene-type polymer having a film thickness of 20/10/20 $\mu$m has an oxygen permeability of 7000 cc/m$^2$.24hr.atm. The above three-layer film has a heat seal strength of 1.4 Kgf/15 mm.

Furthermore, in a laminated body of a 4-methyl-1-pentene type resin/a polar group-containing resin, for instance, a 4-methyl-1-pentene type resin and an oxygen-containing type resin such as a polyester or polyamide, the mold releasability of the 4-methyl-1-pentene type resin layer and the gas barrier property, heat resistance and high temperature rigidity of the polyester or the polyamide are possessed concurrently and the material can have excellent transparency, impact strength and drop-shatter strength. Hence, the material may be used preferably in such used as a bottle, a container, a film or a bag having both mold releasability and gas barrier property.

The 4-methyl-1-pentene type polymer (E) used in the laminated body of the invention may be a homopolymer of 4-methyl-1-pentene, or a copolymer of 4-methyl-1-pentene and ethylene or an α-olefin, namely a polymer composed chiefly of at least 80% by weight of 4-methyl-1-pentene. Especially, from the standpoint of increasing adhesion property, the copolymers are preferred, and it is preferred that the content of 4-methyl-1-pentene should be not larger than 99.9% by weight.

Other α-olefins used for copolymerization include ethylene and α-olefins having 3 to 20 carbon atoms such as propylene, 1-butene, 1-hexene, 1-octene, 1-decene, 1-tetradecene and 1-octadecene. When the copolymers have other α-olefins, these α-olefins may be used singly or in a combination of at least two monomers. Preferred α-olefin components include 1-decene, 1-tetradecene, 1-hexadecene, 1-octadecene and 1-eicosene.

Such a 4-methyl-1-pentene type polymer (E) has a melt flow rate (MFR), as measured in accordance with ASTM D1238 at a load of 5.0 Kg and at a temperature of 260° C., of generally preferably 0.1 to 200 g/10 minutes, more preferably 1.0 to 150 g/10 minutes. The above polymer usually has an oxygen permeability coeficient of at 1 least 1700 cc.mm/m$^2$.24hr.atm. to 2300 cc.mm/m$^2$.24hr.atm.

When the thermoplastic resin (F) used in this invention is an olefin polymer resin, examples of usable olefins may include ethylene and α-olefins having 3 to 20 carbon atoms such as ethylene, propylene, 1-butene, 1-hexene and 1-octene. The ethylene and α-olefins may be used singly or in a combination of at least two monomers.

Such olefin polymer resins include ethylene and α-olefins containing 3 to 4 carbon atoms or polyolefins containing them as a main component such as polyolefins that is polyethylene, polypropylene, and polybutene-1 and copolymers composed mainly of ethylene, propylene or 1-butene.

Specific examples of the polyethylene include high pressure low density polyethylene (LDPE), an ethylene/propylene copolymer, an ethylene/1-butene copolymer, an ethylene/4-methyl-1-pentene copolymer, an ethylene/1-hexene copolymer, high density polyethylene (HDPE), ethylene/vinyl acetate copolymer and ethylene/acrylic acid copolymer.

Specific examples of polypropylene include polypropylene (propylene homopolymer) and propylene random copolymers (having a propylene content of at least 90 mole %, preferably at least 95 mole %) such as a propylene/ethylene random copolymer, a propylene/ethylene/1-butene random copolymer and a propylene/1-butene random copolymer, and propylene-ethylene random copolymer (having an ethylene content of usually 5 to 30 mole %).

Among these, propylene homopolymer, and the random copolymers are preferred because they have excellent transparency.

Specific examples of poly-1-butene include 1-butene homopolymer, 1-butene/ethylene copolymer, 1-butene/propylene copolymer, and 1-butene/4-methyl-1-pentene copolymer.

In the laminated body of this invention, the olefin polymer or copolymer usable as (F) is a homopolymer of ethylene, or a copolymer of ethylene and another α-olefin. It is preferred to use the ethylene-type copolymer composed of ethylene having an ethylene content of 70 to 90% by weight as a main component.

In the case of the copolymers, examples of the other α-olefins include α-olefins having 3 to 20 carbon atoms such as propylene, 1-butene, 1-hexene, 1-octene, 1-decene, 1-tetradecene and 1-octadecene. Such other α-olefins may be used singly or in a combination of at least two monomers.

Such ethylene-type polymer has a melt flow rate (MFR), as measured in accordance with ASTM D1238 at a load of 2.0 Kg and at a temperature of 190° C., of generally preferably 0.1 to 200 g/10 minutes, especially preferably 1.0 to 150 g/10 minutes. The above polymer usually has an oxygen permeability coefficient of 150 cc.mm/m$^2$.24hr.atm. to 220 cc.mm/m$^2$.24hr.atm. Furthermore, the heat seal strength of the above polymer (F) depends upon the thickness, but a film having a thickness of 20 $\mu$m usually has a heat seal strength in a range of 1.2 Kgf/15 mm to 2.0 Kgf/15 mm.

Examples of thermoplastic resins other than α-olefin polymers shown above include polar group-containing resins, preferably oxygen-containing resins.

Specific examples include polyalkylene terephthalate type polyesters or copolyesters such as polyethylene terephthalate and polybutylene terephthalate (containing the terephthalate component in an amount of at least 80% by weight among the discarboxylic acid component and the alkylene group is preferably composed of a butylene group or an ethylene group, especially the ethylene group): Thermoplastic polyesters such as polyalkylene naphthalate polyesters or copolyesters. The polyesters may include small amounts of cyclohexanedimethan and cyclohexanedicarboxylic acid.

There can be mentioned aliphatic polyamides such as nylon 6, nylon 6,6, nylon 12, nylon 4,6, nylon 6,10 and nylon 6,12, aromatic polyamides such as nylon 6.T, nylon 6,I, metaxylene diamine, adipamide, and oxygen-containing thermoplastic resins such as polycarbonate, polyphenylene oxide. Of these, polyesters and polyamides, especially polyesters, are preferred.

It is preferred that these bonding oxygen containing polymers have an intrinsic viscosity $[\eta]$ of from 0.5 to 3 dl/g. When the polymer is a polyester, $[\eta]$ is ordinarily measured in o-dichlorobenzen solution at 25° C., when it is a polyamide, $[\eta]$ is ordinarily measured in conc-$H_2SO_4$ solution at 30° C., when it is a polycarbonate, $[\eta]$ is ordinarily measured in methylene chloride at 20° C., and when it is a polyphenylene oxide, $[\eta]$ is ordinarily measured in chlorobenzene solution at 25° C.

The thickness ratios of (E) layer, (F) layer and the layer of the adhesive resin composition layer which constitutes the laminated body of the present invention are not particularly limited, but can be properly selected according to the shape, the size and the use of the laminated body. However, the thickness ratios are in the range of 1 to 100:1 to about 100:1 to about 100.

The thickness of the laminated body is not particularly limited, and can be properly selected depending upon the shape, the size and the use of the laminated body. Usually, the total thickness of the laminated body is about 0.015 to 13 mm.

When the laminated molded product is a container such as a bottle, it is preferred that the thickness ratios of the individual layers are 1 to 20:1 to 20:1, and the total thickness is about 0.26 to about 7.5 mm.

When a molded product of the laminated body is a film, the thickness ratios the individual layers are 1 to 50:1 to 50:1 to about 50, and the total thickness is preferably about 0.02 to 0.2 mm.

The adhesion strength of the laminated body is at least 0.2 Kgf/15 mm, usually 0.2 to 5 Kgf/15 mm.

The laminated body of this invention comprises the above three layers as essential constituent layers. Another layer may be further laminated on the three layers to form four or more layers.

A method of preparing the laminated body of the invention is not limited to the below-described method. For example, in the case of producing a laminated film or a sheet, the adhesive resin composition of the present invention, the 4-methyl-1-pentene polymer or copolymer (E), thermoplastic resin (F) are co-extruded and molded; a sheet or a film of resins prepared by press molding or extrusion molding in advance is laminated by press molding.

When a container such as a laminated bottle is to be produced, molding methods such as multi-layer blow molding, press molding, may be exemplified.

The 4-methyl-1-pentene type polymer composition has very high adhesion properties to both of the 4-methyl-1-pentene type polymer and thermoplastic resin, especially an olefin polymer, such as an ethylene polymer, and can be used as an adhesive layer for the 4-methyl-1-pentene type polymer and the thermoplastic resin.

In a laminated body (multilayered structure) of the 4-methyl-1-pentene type polymer/adhesive layer/olefin type polymer (especially, an ethylene type polymer is used as the olefin polymer) obtained by using the composition obtained by this invention, layers of the olefin type polymer, especially the ethylene type polymer, can be heat sealed to each other to give a bag having high adhesion strength and toughness, and can be used as various packaging materials. For example, since the 4-methyl-1-pentene type polymer has high gas permeability and heat resistance, the products can be used as various bags for preserving vegetables and fruits, closure materials for containers for preserving vegetables and fruits, and bags which require instantaneous heat resistance for utilization in a retorting step. Furthermore, bottles for containing agricultural chemicals and cosmetics can be preferably utilized by making the best use of the characteristic of good liquid drainability of the 4-methyl-1-pentene type polymer composition.

Furthermore, a 2-layer film or sheet of the 4-methyl-1-pentene type polymer/the adhesive composition can also be used as a closure material which can heat-seal a container composed of the ethylene type polymer.

Furthermore, in a laminated body of a 4-methyl-1-pentene type resin/a polar group-containing resin, for instance, a 4-methyl-1-pentene type resin and an oxygen-containing type resin such as a polyester or a polyamide, the mold releasability of the 4-methyl-1-pentene type resin layer and the gas barrier property, heat resistance and high temperature rigidity of the polyester or the polyamide are possessed concurrently and the material can have excellent transparency, impact strength and shatter strength. Hence, the material may be used preferably in such uses as a bottle, a container a film or a bag having both mold releasability and gas barrier property.

EXAMPLES

The composition of the invention will be described by the following Examples, but the present invention should not be limited by the Examples so long as the invention does not exceed the essence of these Examples.

The compositions shown in the Examples were prepared under the conditions described below. Furthermore, the measuring methods and conditions of the properties shown in these Examples are given below.

(1) Preparation of the compositions

Predetermined amounts of the 4-methyl-1-pentene type polymer, the ethylene/butene copolymer, the 1-butene type polymer and the propylene type copolymer were dry-blended by a Henschel mixer, and melt-kneaded by a 65 mm extruder (predetermined temperature: 280° C.).

(2) Preparation of a three-layered sheet

A sheet was molded from the 4-methyl-1-pentene type polymer and a sheet was also molded from the ethylene type polymer by using a press-molding machine. Then, the 4-methyl-1-pentene type polymer sheet/composition sheet/ethylene type polymer sheet were superimposed in this order and subjected to a press-forming machine to prepare a three-layered sheet. The molding conditions for forming each sheet are shown below.

1. Molding conditions for the 4-methyl-1-pentene type polymer and the composition sheet

| | |
|---|---|
| Starting material: | A copolymer of 4-methyl-1-pentene and 1-octadecene with a 4-methyl-1-pentene content of 94% by weight (abbreviated as PMP-1) |
| Pressing temperature: | 280° C. |
| Pre-heating time: | 10 minutes |
| Pressure: | 50 Kg/cm$^2$ |
| Pressure applying time: | 4 minutes |
| Thickness of the 4-methyl-1-penten type polymer sheet: | 1 mm |
| Thickness of the composition sheet: | 0.3 mm |

2. Molding conditions for the ethylene type polymer sheet

| Starting material: | Homopolymer of ethylene (LDPE) having an ethylene content of 100% by weight (abbreviated as PE-1) |
|---|---|
| Press temperature: | 200° C. |
| Preheating time: | 5 minutes |
| Pressure: | 50 Kg/cm$^2$ |
| Pressure applying time: | 4 minutes |
| Thickness of the sheet: | 1 mm |

3. Molding conditions for preparing a three-layered sheet

| Pressing temperature (on the side of the 4-methyl-1-pentene type polymer): | 280° C. |
|---|---|
| Pressing temperature (on the side of the ethylene type polymer): | 250° C. |
| Pre-heating time: | 8 minutes |
| Pressure: | 50 Kg/cm$^2$ |
| Pressure applying time: | 3 minutes |
| Thickness of the sheet: | 1.8 mm (thickness of each layer = 0.8/0.2/0.8 mm) |

| Starting material | Extruding temperatures |
|---|---|
| PMP-1 | 250° C. |
| Composition (adhesive layer) | 230° C. |
| Ethylene homopolymer (HDPE) (Ethylene content = 100% by weight; to be abbreviated as PE-2) | 210° C. |

(4) Molding of a three-layered film

A three-layered film having a thickness of 50μ and consisting of (PMP-1/composition/ethylene type polymer= 20/10/20 μm) was molded by using a three-layered film-forming machine. The temperature of the die was adjusted to 280° C., and the clearance of the die was adjusted to 0.5 mm. The extruding temperatures of the starting materials were maintained as follows.

| Starting materials | Extruding temperatures |
|---|---|
| PMP-1 | 280° C. |
| Composition (adhesive layer) | 250° C. |
| Ethylene/4-methyl-1-pentene copolymer (Ethylene content 10% by weight; abbreviated as PE-3) | 250° C. |
| or ethylene/4-methyl-1-pentene copolymer (Ethylene content 5% by weight; abbreviated as PE-4) | 250° C. |
| or, Polyethylene terephthalate (density 1.41, inherent viscosity 1.4 dl/g; to be abbreviated as PET) | 290° C. |

(1) Evaluation of properties

1. Measurement of MFR

A 4-methyl-1-pentene type polymer, an ethylene-butene copolymer, a 1-butene type polymer and a propylene-butene copolymer of predetermined amounts were kneaded by using a biaxial extruder to prepare a composition. MFR of the resulting composition was measured in accordance with ASTM D1238 at a load of 5 Kg and at a temperature of 260° C.

2. Measurement of the adhesive strength

The three-layered sheet, the three-layered blow bottle and the three-layered film were subjected to a T peel test under the following conditions to test their peel strengths.

Testing method: T peel
Testing speed: 300 mm/min.
Peel width: 15 mm
Temperature: 23° C.

3. Measurement of heat seal strength

Polyethylene type polymer layers of the three-layered film were heat sealed by pressing them with a heat seal bar (temperature 120° C.) for 2 seconds. The heat seal strength of this portion was measured under the same conditions as the adhesion strength.

4. Measurement of oxygen permeability

The oxygen permeability of the three-layered film was measured by using a MOCON OXTRAN 10/50 in accordance with JIS K7126, B method.

EXAMPLE 1

Thirty parts by weight of a 4-methyl-1-pentene type polyMer (1-octadecene content=6% by weight, MFR=3.0 g/10 minutes), 50 parts by weight of an ethylene-butene copolymer (having a 1-butene content of 45% by weight; MFR=1.0 g/10 minutes), 20 parts by weight of a 1-butene type polymer (ethylene content 5% by weight, MFR=2.5 g/10 minutes), and as stabilizers, 0.10 part by weight of 3,9-bis[2-{3-(3-tert-butyl-4-hydroxy-5-methylphenyl) propionyloxy)-1,1-dimethylethyl]2,4,8,10-tetraoxaspiro[5, 5] undecane (Sumilizer GA80, a tradename, manufactured by Sumitomo Chemical Co., Ltd.), 0.20 part by weight of penta(erythrityl-tetra-β-mercaptolauryl) propionate (Seenox 412S, a tradename, manufactured by Shipro Chemical Co.) and 0.03 part by weight of calcium stearate (Calcium Stearate, a tradename, manufactured by Sankyo Organic Synthesis Co., Ltd.) were mixed and dry blended by using a Henschel mixer. The resulting mixture was melt kneaded by a biaxial extruder kept at 280° C. to prepare an adhesive composition (TL1). MFR of the resulting composition was measured, and the result was shown in Table 1.

Then, a sheet was formed from each of the resulting composition, PMP-1 (MFR=20 g/10 minutes) and PE-1 (MFR=0.35 g/10 minutes) by a pressing method. Subsequently, the sheet of the composition was placed between the sheet of PMP-1 and the sheet of PE-1, and a three-layered sheet of PMP-1/adhesive layer/PE-1 was prepared by a pressing method. The resulting sheet had a thickness construction of 0.8/0.2/0.8 mm. The adhesive strength of the three-layered sheet was measured and is shown in Table 2.

EXAMPLE 2

Forty parts by weight of a 4-methyl-1-pentene type polymer (1-octadecene content=6% by weight; MFR=3.0 g/10 minutes), 40 parts by weight of an ethylene-butene copolymer (1-butene content=15% by weight; MFR=3.5 g/10 minutes), 20 parts by weight of a 1-butene type polymer (ethylene content=5% by weight; MFR=2.5 g/10 minutes), and as stabilizers, 0.10 part by weight of 3, 9-bis[2-{3-(3-tert-butyl- 4-dimethylethyl]2, 4, 8, 10-tetraoxa-spiro[5, 5]undecane (Sumilizer GA 80, tradename, manufactured by Sumitomo Chemical Co. Ltd.), 0.20 part by weight of penta (erythrityl-tetra-β-mercapto-lauryl)propionate (Seenox412S, a tradename, manufactured by Shipro Chemical Co.), and 0.03 part by weight of calcium stearate (Calcium Stearate, a tradename, manufactured by Sankyo Organic Synthesis Co., Ltd.) were mixed , and dry blended with a Henschel mixer. The resulting mixture was melt kneaded by a biaxial extruder kept at 280° C. to prepare an adhesive composition (TL2). The MFR of the composition was measured, and is shown in Table 1.

Then, a sheet was prepared from each of the composition, PMP-1 (MFR=20 g/10 minutes) and PE-1 (MFR=0.35 g/10 minutes) by a pressing method.

Subsequently, the sheet of the composition was placed between PMP-1 and PE-1, and a three-layered sheet composed of PMP-1/adhesive layer/PE-1 was molded by a pressing method. The sheet had a thickness construction of 0.8/0.2/0.8 mm. The adhesive strength of the obtained three-layered sheet was measured, and is shown in Table 2.

EXAMPLE 3

Forty parts by weight of a 4-methyl-1-pentene type polymer (1-octadecene content=6% by weight; MFR=3.0 g/10 minutes), 40 parts by weight of an ethylene-butene copolymer (1-butene content=15% by weight; MFR=3.5 g/10 minutes), 10 parts by weight of a 1-butene type polymer (ethylene content=5% by weight; MFR=2.5 g/10 minutes), 10 parts by weight of a propylene-butene copolymer (1-butene content=20% by weight; MFR=5.0 g/10 minutes), and as stabilizers, 0.10 part by weight of 3, 9-bis[2-{3-(3-tert-butyl-4-hydroxy-5-methylpheny)propionyloxy}- 1, 1-dimethylethyl]2, 4, 8, 10-tetraoxaspiro[5, 5]undecane (Sumilizer GA80, a tradename, manufactured by Sumitomo Chemical Co., Ltd.), 0.20 part by weight of penta(erythrityl-tetra-β-mercaptolauryl)propionate (Seenox 412S, a tradename, manufactured by Shipro Co.) and 0.03 part by weight of calcium stearate (Calcium Stearate, a trademark, manufactured by Sankyo Organic Synthesis Co., Ltd.) were mixed, and dry blended by using a Henschel mixer. The resulting mixture was melt kneaded by a biaxial extruder kept at 280° C. to prepare an adhesive composition (TL3). MFR of this composition was measured, and is shown in Table 1.

Then, a sheet was prepared from each of the composition, PMP-1(MFR=20 g/10 minutes), and PE-1 (MFR=0.35 g/10 minutes) by a pressing method.

Subsequently, the sheet of the composition was placed between the sheet of PMP-1 and the sheet of PE-1, and a three-layered sheet composed of PMP-1/adhesive layer/ PE-1 was molded by a pressing method. The resulting sheet had a thickness construction of 0.8/0.2/0.8 mm. The adhesive strength of the resulting three-layered sheet was measured, and is shown in Table 2.

EXAMPLE 4

Using the adhesive composition prepared in Example 2, a three-layered blow bottle consisting of PMP-1/adhesive composition/PE-2 (MFR=0.40 g/10 minutes) was molded. The bottle had a thickness construction of 1.0/0.1/0.4 mm. The adhesive strength of the three-layered bottle was measured, and is shown in Table 3.

EXAMPLE 5

Using the adhesive composition (TL3) prepared in Example 3, a three-layered bottle consisting of PMP-1/ adhesive composition/PE-2 (MFR=0.40 g/10 minutes) was molded. The bottle had a layer construction of 1.0/0.1/0.4 mm. The adhesive strength of the three-layered blow bottle was measured, and is shown in Table 3.

EXAMPLE 6

Using the adhesive composition (TL3) prepared in Example 3, a three-layered film consisting of PMP-1/ adhesive composition/PE-3 (MFR=2.0 g/10 minutes) was molded. The film had a thickness construction of 20/10/20 μm. The adhesive strength, the heat seal strength and the oxygen permeability of the three-layered film were measured, and are shown in Table 4.

EXAMPLE 7

Using the adhesive composition (TL3) prepared by Example 3, a three-layered film composed of PMP-1/ adhesive composition/PE-4 (MFR=2.0 g/10 minutes) was molded. The film had a thickness construction of 20/10/20 μm. The adhesive strength, the heat seal strength and the oxygen permeability of the three-layered film were measured, and are shown in Table 4.

EXAMPLE 8

Using the adhesive composition (TL3) prepared in Example 3, a three-layer film (PMP-1/adhesive resin composition/PET (polyethylene terephthalate: density 1.41, inherent viscosity 1.4 dl/g) was molded. The thickness structure was 20/10/20 μm.

The adhesion strength, heat seal strength and oxygen permeability of the three-layer film were measured. The results are shown in Table 4.

COMPARATIVE EXAMPLE 1

An adhesive composition (TL4) was prepared by using 50 parts by weight of a 4-methyl-1-pentene type polymer (1-octadecene content=6% by weight; MFR=3.0 g/10 minutes), and 50 parts by weight of an ethylene/butene copolymer (1-butene content=45% by weight; MFR=1.0 g/10 minutes). Otherwise, in the same way as in Example 1, the adhesive strength of the three-layered sheet was measured, and is shown in Table 2.

COMPARATIVE EXAMPLE 2

An adhesive composition (TL5) was prepared by using a propylene/butene copolymer (1-butene content=20% by weight; MFR=5.0 g/10 minutes) instead of the 1-butene type polymer (ethylene content=5% by weight; MFR=2.5 g/10 minutes). Otherwise, in the same way as in Example 2, the adhesive strength of the three-layered blow bottle was measured, and is shown in Table 3.

COMPARATIVE EXAMPLE 3

An adhesive composition (TL5) was prepared by using a propylene/butene copolymer (1-butene content=20% by weight; MFR=5.0 g/10 minutes) instead of the 1-butene type polymer (ethylene content=5% by weight; MFR=5.0 g/10 minutes). Otherwise, in the same way as in Example 6, the adhesive strength, the heat seal strength and the oxygen permeability of the three-layered film were measured, and are shown in Table 4.

TABLE 1 the composition and MFR of the 4-methyl-pentene type composition

| Composition | 4-methyl-1-pentene type composition (parts by weight) | | | | | MFR |
|---|---|---|---|---|---|---|
| | PMP | EBR-1 | EBR-2 | PB | PBR | |
| TL1 | 30 | 50 | | 20 | — | 20 |
| TL2 | 40 | | 40 | 20 | — | 30 |
| TL3 | 40 | | 40 | 10 | 10 | 25 |
| TL4 | 50 | 50 | | — | — | 30 |
| TL5 | 40 | | 40 | — | 20 | 30 |

PMP: 4-methyl-1-pentene type polymer
EBR-1: ethylene-butene copolymer; butene-1 content = 45% by weight; MFR = 1.0 g/10 minutes.
EBR-2: ethylene-butene copolymer; butene-1 content = 15% by weight; MFR = 3.5 g/10 minutes.
PB: 1-butene type polymer
PBR: propylene-butene copolymer

TABLE 2 the adhesion strength of the three-layered sheet

| Experiment No. | Construction of the three-layered sheet | Adhesion test | |
|---|---|---|---|
| | | Adhesion strength | Form of peel |
| Example 1 | PMP-1/TL1/PE-1 | 4.2 | Aggregation fracture |
| Example 2 | PMP-1/TL2/PE-1 | 3.7 | Aggregation fracture |
| Example 3 | PMP-1/TL3/PE-1 | 4.5 | Aggregation fracture |
| Comparative Example 1 | PMP-1/TL4/PE-1 | 0.2 | TPX/TL interface |

(Note): Unit of adhesion strength = Kgf/15 mm

TABLE 3

Adhesion strength of a three-layered blow bottle

| Experiment No. | Construction of a three-layered blow bottle | Adhesion test | |
|---|---|---|---|
| | | Adhesion strength | Form of peel |
| Example 4 | PMP-1/TL2/PE-2 | 3.5 | Aggregation fracture |
| Example 5 | PMP-1/TL3/PE-2 | 4.3 | Aggregation fracture |
| Comparative Example 2 | PMP-1/TL5/PE-2 | 0.7 | TPX/TL interface |

(Note): Unit of adhesion strength = Kgf/15 mm

TABLE 4

Properties of a three-kayered film

| Experimental No. | Construction of a three-layered film | Adhesion test | | Heat seal strength (kgf/15 mm) | Oxygen permeability |
|---|---|---|---|---|---|
| | | Adhesion strength | Form of peel | | |
| Example 6 | PMP-1/TL3/PE-3 | 0.20 | Aggregation failure | 1.4 | 7000 |
| Example 7 | PMP-1/TL3/PE-4 | 0.25 | Aggregation failure | 1.4 | 7000 |
| Comparative Example 3 | PMP-1/TL5/PE-3 | 0.06 | TPX/TL interface | 0.8 | 6900 |
| Example 8 | PMP-1/TL3/PET | 0.28 | Aggregation failure | 1.8 | — |

(Note): Unit of adhesion strength = kgf/15 mm; Oxygen permeability = cc/m$^2$ · 24 hr. atm.

What is claimed is:

1. A 4-methyl-1-pentene resin composition comprising:
   (A) 20 to 60 parts by weight of a copolymer of 4-methyl-1-pentene and an olefin other than 4-methyl-1-pentene said copolymer containing at least 80% by weight of 4-methyl-1-pentene,
   (B) 30 to 60 parts by weight of a random copolymer of ethylene and 1-butene containing 10 to 50% by weight of 1-butene,
   (C) 5 to 40 parts by weight of a homopolymer of 1-butene or a copolymer of 1-butene with ethylene or another α-olefin, the content of 1-butene in the copolymer being at least 60% by weight, and
   (D) 0 to 30 parts by weight of a propylene/butene random copolymer containing 10 to less than 50% by weight of 1-butene, with the proviso that the total amount of (A), (B), (C) and (D) is 100 parts by weight.

2. The resin composition according to claim 1 wherein the copolymer (A) is a copolymer of 4-methyl-1-pentene and an olefin selected from the group consisting of ethylene and an α-olefin having 3 to 20 carbon atoms other than 4-methyl-1-pentene.

3. The resin composition according to claim 1 wherein the 1-butene/olefin copolymer (C) is a random copolymer of 1-butene and an olefin selected from the group of ethylene and an α-olefin having 3 to 20 carbon atoms.

4. The resin composition of claim 1 wherein in the resin composition the copolymer (D) is in an amount of 5 to 20 parts by weight.

5. The resin composition of claim 2 wherein in the copolymer (A) the olefin other than 4-methyl-1-pentene is a member selected from the group consisting of 1-decene, 1-dodecene, 1-tetradecene, 1-hexadecene, 1-octadecene and 1-eicosene.

6. The resin composition of claim 2 wherein in the copolymer (A) the olefin other than 4-methyl-1-pentene comprises 1-octadecene.

7. The resin composition of claim 3 wherein in the copolymer (C) the olefin is a member selected from the group consisting of ethylene, propylene, 1-hexene, 1-octene, 1-decene, 1-tetradecene and 1-octadecene.

8. The resin composition of claim 3 wherein in the copolymer (C) the olefin is a member selected consisting of ethylene and propylene.

9. A 4-methyl-1-pentene resin composition comprising:
   (A) 30 to 50 parts by weight of a copolymer of 4-methyl-1-pentene and ethylene or another α-olefin other than 4-methyl-1-pentene, said copolymer containing at least 80% by weight of 4-methyl-1-pentene,
   (B) 35 to 50 parts by weight of a random copolymer of ethylene and 1-butene containing 10 to 50% by weight of 1-butene,
   (C) 10 to 30 parts by weight of a homopolymer of 1-butene or a copolymer of 1-butene with ethylene or an α-olefin, the content of 1-butene in the copolymer being at least 60% by weight, and
   (D) 5 to 20 parts by weight of a propylene/butene random copolymer containing 10 to less than 50% by weight of 1-butene, with the proviso that the total amount of (A), (B), (C) and (D) is 100 parts by weight.

10. The composition according to claim 9 wherein the 4-methyl-1-pentene copolymer (A) is a copolymer of 4-methyl-1-pentene and an olefin selected from the group consisting of ethylene and an α-olefin having 3 to 20 carbon atoms other than 4-methyl-1-pentene, and the content of the 4-methyl-1-pentene component of the copolymer is at least 80% by weight of the copolymer.

11. The resin composition according to claim 9 wherein the 1-butene/olefin copolymer (C) is a random copolymer of 1-butene and an olefin selected from the group of ethylene and an α-olefin having 3 to 20 carbon atoms, and the content of 1-butene is at least 60% by weight.

* * * * *